US007924826B1

(12) United States Patent
Muntz et al.

(10) Patent No.: US 7,924,826 B1
(45) Date of Patent: Apr. 12, 2011

(54) METHOD AND APPARATUS FOR DEVICE PINOUT MAPPING

(75) Inventors: Gary S. Muntz, Lexington, MA (US); Michael Fisher, Groton, MA (US)

(73) Assignee: Cisco Technology, Inc., San Jose, CA (US)

( * ) Notice: Subject to any disclaimer, the term of this patent is extended or adjusted under 35 U.S.C. 154(b) by 945 days.

(21) Appl. No.: 10/838,014

(22) Filed: May 3, 2004

(51) Int. Cl.
*H04L 12/50* (2006.01)

(52) U.S. Cl. .......................................... 370/359; 326/38

(58) Field of Classification Search .................. 370/359, 370/365, 394, 397, 400, 474, 476, 506; 709/228, 709/229, 313; 710/20, 74, 307
See application file for complete search history.

(56) References Cited

U.S. PATENT DOCUMENTS 5,061,825 A * 10/1991 Catlin ........................... 174/261
5,603,044 A * 2/1997 Annapareddy et al. ....... 710/301
5,822,551 A * 10/1998 Crane et al. .................. 710/307
6,202,110 B1 * 3/2001 Coteus et al. ................ 710/301
6,210,175 B1 * 4/2001 Payne ............................ 439/69
6,813,651 B1 * 11/2004 Smith et al. ..................... 710/20
6,976,103 B1 * 12/2005 Watanabe et al. ............... 710/74
2003/0101426 A1 * 5/2003 Sarkinen et al. ................ 716/12
2003/0225924 A1 * 12/2003 Jung et al. ..................... 709/313

* cited by examiner

*Primary Examiner* — Seema S Rao
*Assistant Examiner* — Leon Andrews
(74) *Attorney, Agent, or Firm* — Hamilton, Brook, Smith & Reynolds, P.C.

(57) ABSTRACT

A “pinout mode” control capability incorporated into an integrated circuit device controls an internal mapping function, with the effect that the device pinout is adjusted by the setting of the pinout mode. An integrated circuit device includes a data interface with plural physical ports each having a physical port identifier and a mapper for mapping the physical port identifiers to logical port identifiers based on a selected mode setting, each mode setting defining a different port mapping. A data circuit is coupled to the data interface, the data circuit processing data sent to and received from the data interface based on the logical port identifiers.

20 Claims, 4 Drawing Sheets

METHOD AND APPARATUS FOR DEVICE PINOUT MAPPING

BACKGROUND

Printed circuit boards typically have multiple wiring layers. The number of layers is a function of the complexity of the circuit board, including the density of devices on the board and the configuration of device-to-device connections and device-to-backplane connections. Routing of connections that include crossovers generally require more board layers. A couple of integrated circuits on a single printed circuit board can cause substantial connection routing problems. This wiring can be particularly troublesome when multiple ICs connect to busses that are intertwined, as can occur on a backplane connector.

One approach to the routing problem with respect to multiple RAM chips is the use of so-called mirror-image RAM chips. In this approach, a new part number is created with a pinout configuration that is approximately the mirror image of the original part. This mirror image approach can facilitate routing to a pair of RAMs in the case where one RAM chip is mounted on each side of the printed circuit board, roughly overlaying each other. In particular, one part number is used on the top and the other part number is used on the bottom of the board. In this configuration, the wiring to one RAM is used for both, obviating separate wires to the second RAM, and the attendant wiring difficulty. In a variant of this mirror image approach, some RAM parts are pinned out so that a single part number can be used in this manner by re-defining which data and address bits go to each pin. However, this pin redefinition is transparent to the operation of the RAM.

SUMMARY

There is a need to reduce the complexity of circuit board wiring configurations in order to reduce the number of layers required to provide device-to-device connections and device-to-backplane connections.

A “pinout mode” control capability is provided in accordance with the present invention. The pinout mode incorporated into an integrated circuit device controls an internal mapping function, with the effect that the device pinout is adjusted by the setting of the pinout mode. Thus, the pinout of each instance of an integrated circuit device on a single printed circuit board can be optimized by setting the pinout mode accordingly. Such optimization facilitates easier board routing and provides substantial cost savings because the board can use fewer layers of routing.

Accordingly, an integrated circuit device comprises a data interface including plural physical ports each having a physical port identifier and a mapper for mapping the physical port identifiers to logical port identifiers based on a selected mode setting, each mode setting defining a different port mapping. A data circuit coupled to the data interface processes data sent to and received from the data interface based on the logical port identifiers.

In one embodiment, the device further includes a second data interface and the data circuit comprises datapath circuitry for connecting data between the first data interface and the second data interface. The datapath circuitry includes a first packet converter for converting first data packets received from a particular first data interface physical port to second data packets to send to the second data interface. The second data packets have a port identifier corresponding to the logical port identifier associated with the physical port identifier of the particular first data interface physical port, based on the selected mode setting. The datapath circuitry includes a second packet converter for converting second data packets having a port identifier received from the second data interface to first data packets to send to the particular first data interface physical port associated with the logical port identifier corresponding to the port identifier, based on the selected mode setting.

In another embodiment, the data circuit comprises a data processing unit and the first data interface physical ports comprise bitwise pinouts.

According to another aspect, an integrated circuit device comprises a first data interface including N ports; a second data interface including N ports; a mapper for mapping the N ports of the first data interface to the N ports of the second data interface in a sequence based on a selected mode setting, each mode setting defining a different port mapping.

According to another aspect, a printed circuit board comprises at least one integrated circuit device having a data interface including plural physical ports each having a physical port identifier, a mapper for mapping the physical port identifiers to logical port identifiers based on a selected mode setting, each mode setting defining a different port mapping, and a data circuit coupled to the data interface, the data circuit processing data sent to and received from the first data interface based on the logical port identifiers; plural connector ports; and plural links connecting the data interface physical ports to the plural connector ports, wherein the mode setting is selected based on the connection sequence between the data interface physical ports and the connector ports.

Another advantage of the present approach is that a single integrated circuit device can have multiple effective pinouts. This approach is far less expensive than building multiple different IC designs having fixed pinouts for each.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
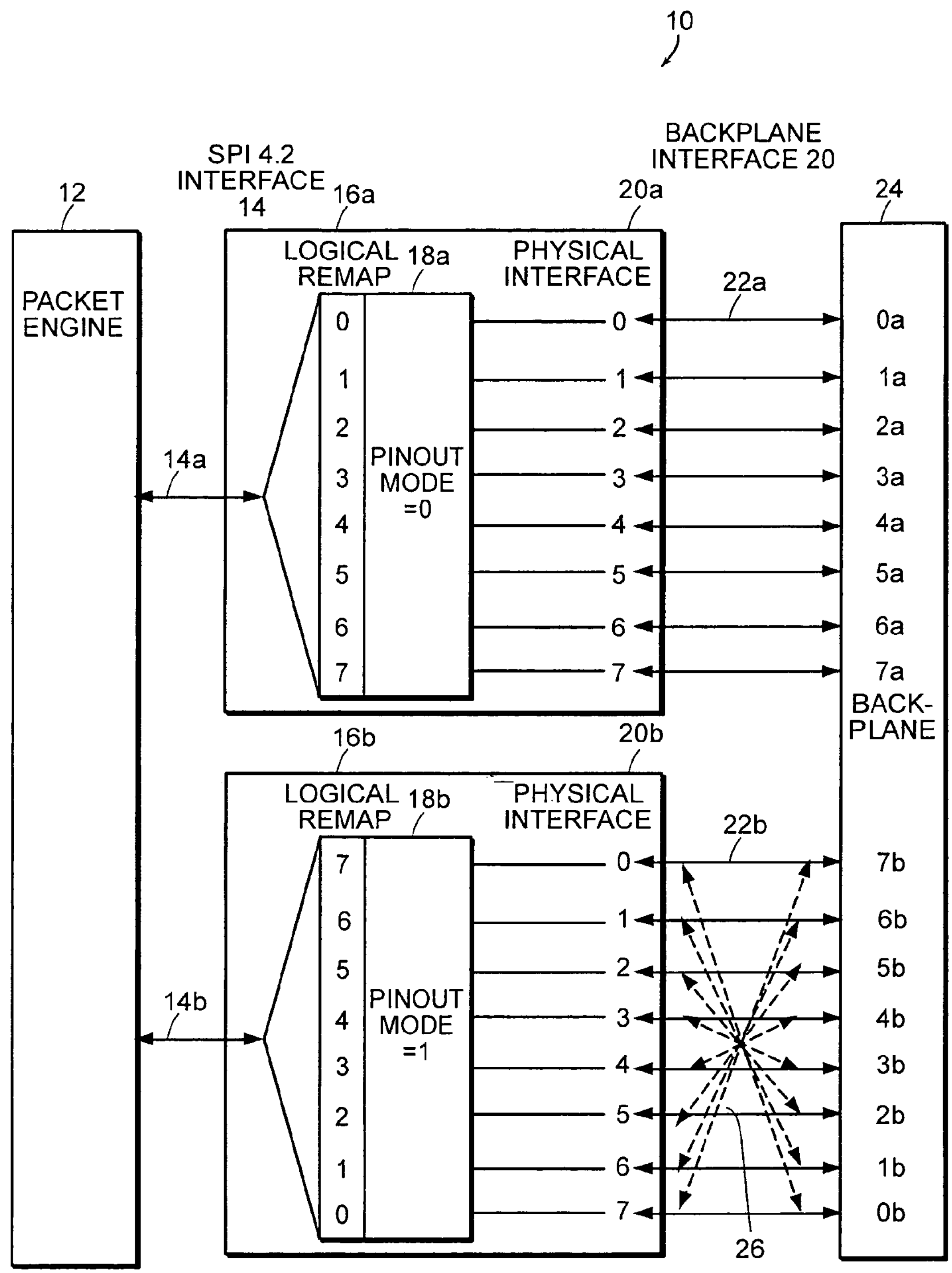
FIG. 1 is a block diagram illustrating a first embodiment of a circuit board arrangement.

FIG. 1 is a block diagram of an embodiment of a printed circuit board arrangement 10 that illustrates principles of the invention. The board 10 includes a packet engine 12, a pair of integrated circuit devices 16*a*, 16*b* and a backplane connector 24. As described further herein, two identical copies of the integrated circuit devices 16*a*, 16*b* each operate to connect data packets between two different data interfaces, shown in this embodiment generally as backplane interface 20 and System Packet Interface Level 4 Phase 2 (SPI4.2) 14. The SPI4.2 interfaces 14*a*, 14*b* of corresponding devices 16*a*, 16*b* are connected to the packet engine 12. The backplane interfaces 20*a*, 20*b* of corresponding devices 16*a*, 16*b* are connected to backplane connector 24. It should be understood that other data interfaces can be used without departing from the scope of the invention.

Backplane wiring configurations generally may be chosen based on various design considerations, such as the need to reduce backplane wire crossings to connect to linecards on the backplane (backplane and linecards not shown). Thus, given a particular backplane wiring configuration, the backplane wiring ports are brought to the printed circuit boards through a backplane connector.

In this arrangement, the backplane connector 24 is shown having ports delineated in a particular order corresponding to a fixed backplane wiring configuration. For example, backplane connector 24 has a first set of connector ports 24-0*a*, 24-1*a*, 24-2*a*, 24-3*a*, 24-4*a*, 24-5*a*, 24-6*a*, 24-7*a* descending in order from the top of the connector towards the middle. From the middle to the bottom of the connector 24 are a second set of connector ports 24-7*b*, 24-6*b*, 24-5*b*, 24-4*b*, 24-3*b*, 24-2*b*, 24-1*b*, 24-0*b* in ascending order. Thus, the ordering of the connector ports in this particular example is different for each set. Because the ordering is different, the wiring on the printed circuit board from the sets of connector ports to devices having identical physical interface pinouts would normally need to be different. For example, the wiring 22*a* from backplane interface physical ports 20*a*-0, 20*a*-1, 20*a*-2, 20*a*-3, 20*a*-4, 20*a*-5, 20*a*-6, 20*a*-7 of device 16*a* to respective backplane connector ports 24-0*a*, 24-1*a*, 24-2*a*, 24-3*a*, 24-4*a*, 24-5*a*, 24-6*a*, 24-7*a* can be done with no wire crossings. In contrast, the wiring from backplane interface physical ports 20*b*-0, 20*b*-1, 20*b*-2, 20*b*-3, 20*b*-4, 20*b*-5, 20*b*-6, 20*b*-7 of device 16*b* to respective backplane connector ports 24-0*b*, 24-1*b*, 24-2*b*, 24-3*b*, 24-4*b*, 24-5*b*, 24-6*b*, 24-7*b* would have at most only one port wired with no crossing, with the seven other ports crossing each other, shown as dotted lines 26. The crossing wires 26 would cause expensive wire routing problems on the board.

To avoid this potential wiring problem, a pinout mode capability on the devices 16*a*, 16*b* provides a mapping function that maps the physical ports to logical ports based on a selected pinout mode, each mode defining a different port mapping. This mapping capability effectively redefines the device pinouts, with the result that both devices can be wired to the backplane in an efficient manner, despite the different port ordering on the backplane. Thus, with the pinout capability, wiring 22*b* from backplane interface physical ports 20*b*-0, 20*b*-1, 20*b*-2, 20*b*-3, 20*b*-4, 20*b*-5, 20*b*-6, 20*b*-7 of device 16*b* is made to respective backplane connector ports 24-7*b*, 24-6*b*, 24-5*b*, 24-4*b*, 24-3*b*, 24-2*b*, 24-1*b*, 24-0*b*.

The different pinout modes for devices 16*a*, 16*b* are shown at 18*a*, 18*b*, respectively. As shown in FIG. 1, physical port identifiers are mapped to an equal number of logical port identifiers. For one mode (e.g., pinout mode=0) the physical ports are mapped to a sequence of logical port identifiers that happen to be the same numerically as the physical port identifiers. That is, as shown for device 16*a*, backplane interface physical ports 20*a*-0, 20*a*-1, 20*a*-2, 20*a*-3, 20*a*-4, 20*a*-5, 20*a*-6, 20*a*-7 are mapped to a sequence of logical port identifiers 0, 1, 2, 3, 4, 5, 6, 7. For another mode (e.g., pinout mode=1) the physical ports are mapped to a sequence of logical port identifiers that are the reverse numerically of the physical port identifiers. That is, as shown for device 16*b*, backplane interface physical ports 20*b*-0, 20*b*-1, 20*b*-2, 20*b*-3, 20*b*-4, 20*b*-5, 20*b*-6, 20*b*-7 are mapped to a sequence of logical port identifiers 7, 6, 5, 4, 3, 2, 1, 0. In this manner, for example, data received from backplane connector port 24-7*b* that is wired to backplane interface physical port 20*b*-0 is assigned port number 7 rather than port number 0 for sending over SPI4.2 interface 14*b*. In contrast, data received from backplane connector port 24-0*a* that is wired to backplane interface physical port 20*a*-0 is assigned port number 0 for sending over SPI4.2 interface 14*a*.

Figure 2:
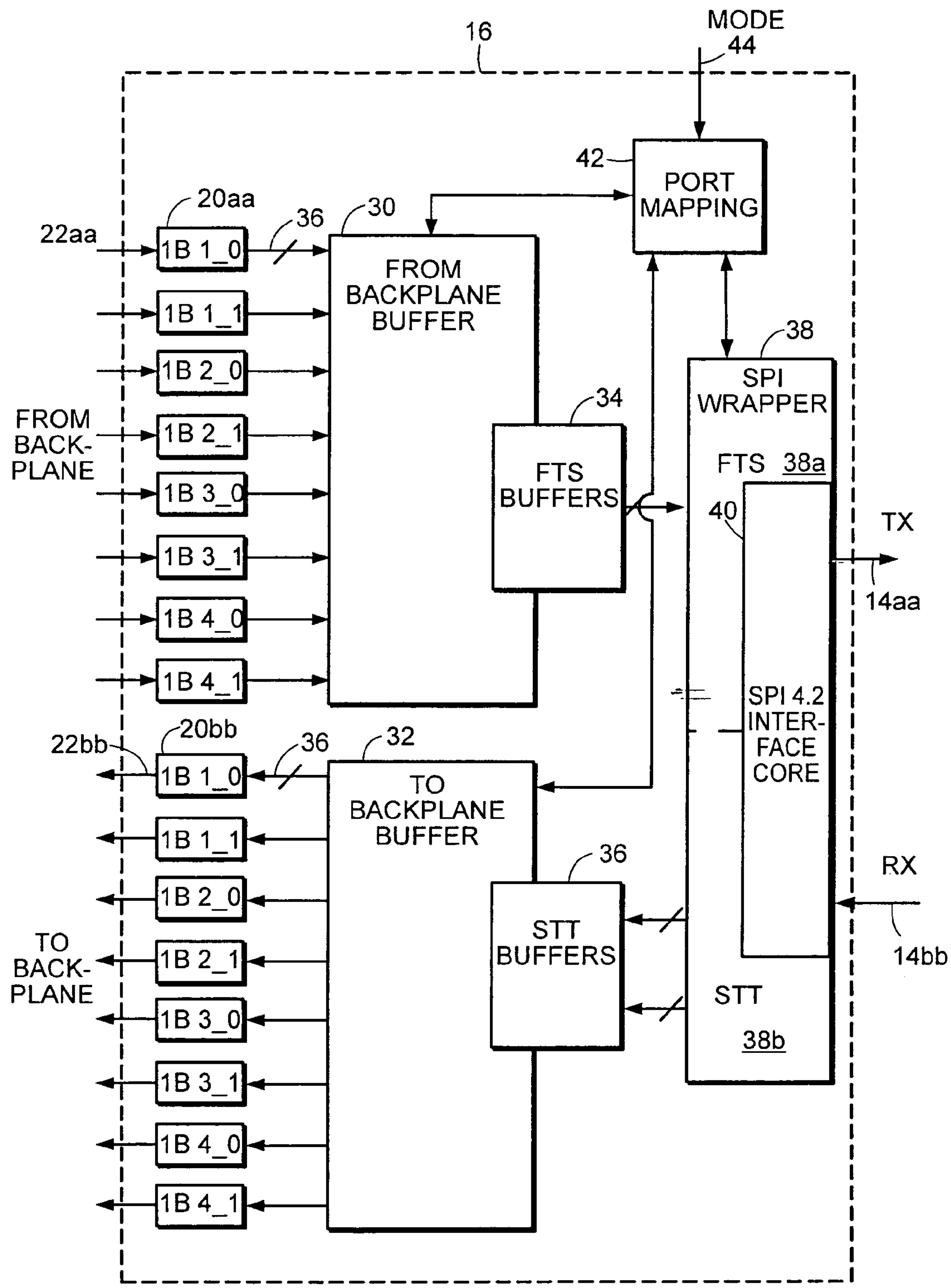
FIG. 2 is a block diagram of an embodiment of an integrated circuit.

FIG. 2 is a block diagram of an embodiment of the integrated circuit 16 of FIG. 1. The device 16 is a datapath device which connects up to 4 full slots/8 half slots of a physical layer, backplane bus interface 20*aa*, 20*bb* and delivers data to and from an SPI4.2 interface 14*aa*, 14*bb* that connects to a packet engine 12 (FIG. 1). In this configuration, the backplane bus comprises 8 ports each having 5 signals (10 wires based on differential routing) in each direction (Rx/Tx). The Rx/Tx physical ports 20*aa*, 20*bb* are delineated IB 1__0, IB 1__1, IB 2__0, IB 2__1, IB 3__0, IB 3__1, IB 4__0, IB 4__1. The ports 20*aa*, 20*bb* connect to backplane connections 22*aa*, 22*bb*, respectively. The SPI4.2 interface is an Optical Internetworking Forum standard interface that comprises a group of 21 signals that sends the 8 ports of data from the backplane bus across this single interface, interleaving data packets.

The datapath circuitry of the device 16 includes From Backplane Buffer (FBB) 30, FBB to SPI (FTS) buffer 34, To Backplane Buffer (TBB) 32, SPI to TBB (STT) buffer 36, and SPI4.2 wrapper 38 which includes SPI4.2 interface core 40. A port mapper 42 provides the pinout mode capability based on a selected mode 44.

The general data packet flow includes egress flow from the packet engine 12 to the backplane 24 (FIG. 1) and ingress flow from the backplane 24 to the packet engine 12 (FIG. 1). Essentially, data packets are transferred from one interface to another interface in the respective ingress and egress flows. Egress traffic begins with data arriving through SPI4.2 receive (Rx) interface 14*bb* and into SPI4.2 interface core 40. The data packet arrives with start-of-packet/end-of-packet (SOP/EOP) information and a port identifier. The port identifier is mapped to a particular backplane transmit (Tx) port 20*bb*. The SPI4.2 interface core 40 brings the data in on the interface and delivers this to the STT unit 38*b* of the SPI4.2 wrapper 38. The STT unit receives the data from the SPI4.2 core and places the data into the STT buffer 36 for the respective mapped port 20*bb*. Each port has its own 2048 byte data buffer for data coming in from the SPI4.2 interface 14*bb*. Data is read from the STT buffer 36 by the TBB 32 and delivered to the respective mapped port 20*bb*. The backplane interface identifier associated with the data packet is assigned by the STT based on the port mapping 42 as defined by the current pinout mode setting for the device.

In the ingress direction, packets arrive from backplane 24 (FIG. 1) through physical ports 20*aa* and is processed by the FBB 30 into the FTS unit 38*a*. Data is read out of the FTS buffer 34 and delivered to the SPI4.2 core 40. The port identifier associated with the data packet is assigned by the FTS unit 38*a* based on the port mapping 42 as defined by the current mode setting for the device.

Other embodiments that feature pinout mapping are now described.

Figure 3:
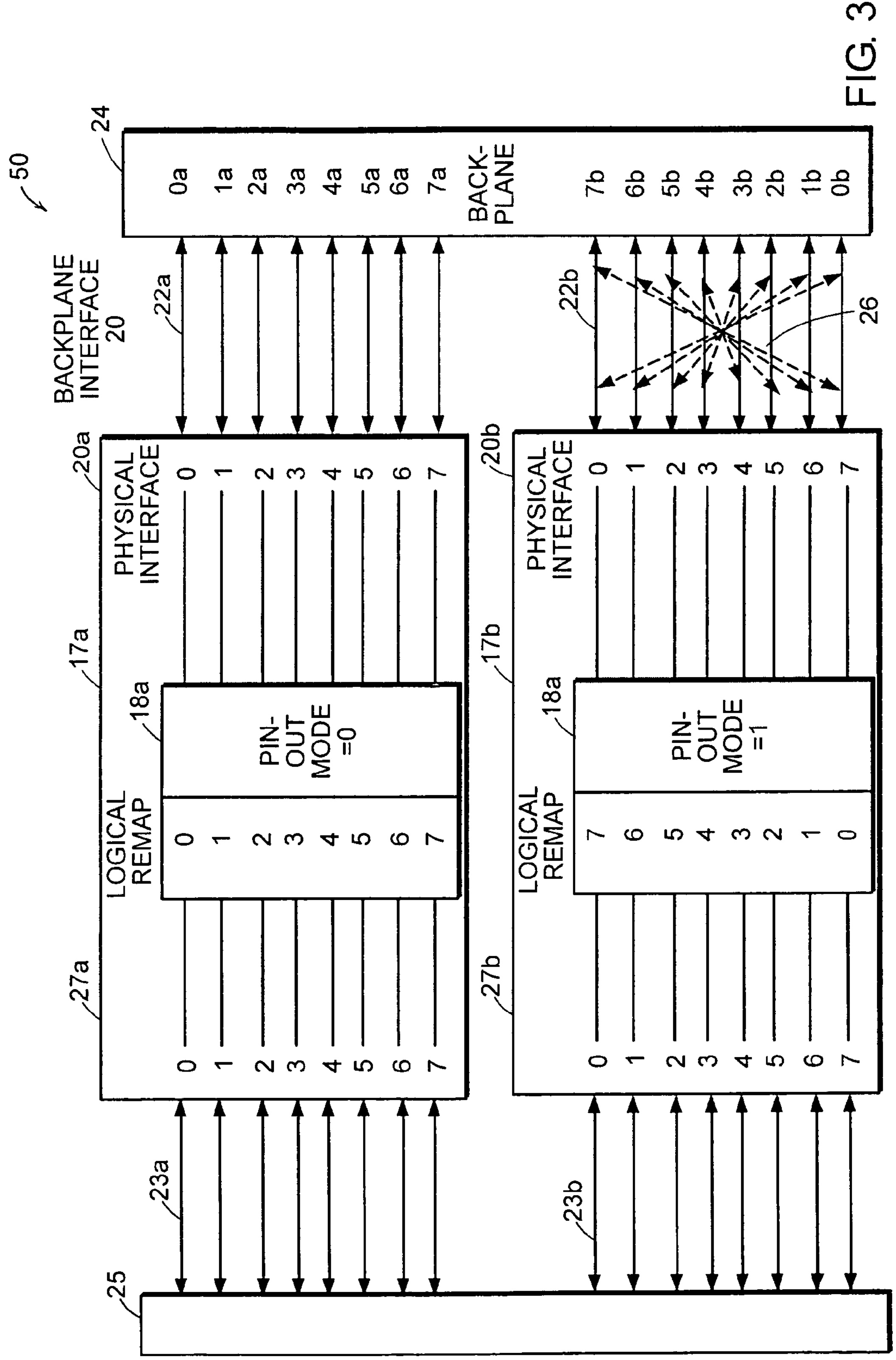
FIG. 3 is a block diagram of a second embodiment of a circuit board arrangement.

FIG. 3 is a block diagram of a second embodiment of a circuit board arrangement 50. In this arrangement, devices 17*a*, 17*b* each have two N port interfaces. In the embodiment shown, N=8. A pinout mode capability 18*a*, 18*b* provides a mapping between the physical ports 20*a*, 20*b* and 27*a*, 27*b* of each interface.

As shown in FIG. 3, physical port identifiers are mapped to an equal number of logical port identifiers. For one mode (e.g., pinout mode=0) the physical ports 20*a* are mapped to a sequence of logical port identifiers that happen to be the same numerically as the physical port identifiers. That is, as shown for device 17*a*, backplane interface physical ports 20*a*-0,

20*a*-1, 20*a*-2, 20*a*-3, 20*a*-4, 20*a*-5, 20*a*-6, 20*a*-7 are mapped to a sequence of logical port identifiers 0, 1, 2, 3, 4, 5, 6, 7. For another mode (e.g., pinout mode=1) the physical ports are mapped to a sequence of logical port identifiers that happen to be the reverse numerically of the physical port identifiers. That is, as shown for device 17*b*, backplane interface physical ports 20*b*-0, 20*b*-1, 20*b*-2, 20*b*-3, 20*b*-4, 20*b*-5, 20*b*-6, 20*b*-7 are mapped to a sequence of logical port identifiers 7, 6, 5, 4, 3, 2, 1, 0. In this manner, for example, data received from backplane connector port 24-7*b* that is wired to backplane interface physical port 20*b*-O is assigned port number 7 rather than port number 0 and is sent over interface port 23*b*-0. In contrast, data received from backplane connector port 24-0*a* that is wired to backplane interface physical port 20*a*-0 is assigned port number 0 and is sent over interface port 23*a*-0.

Figure 4:
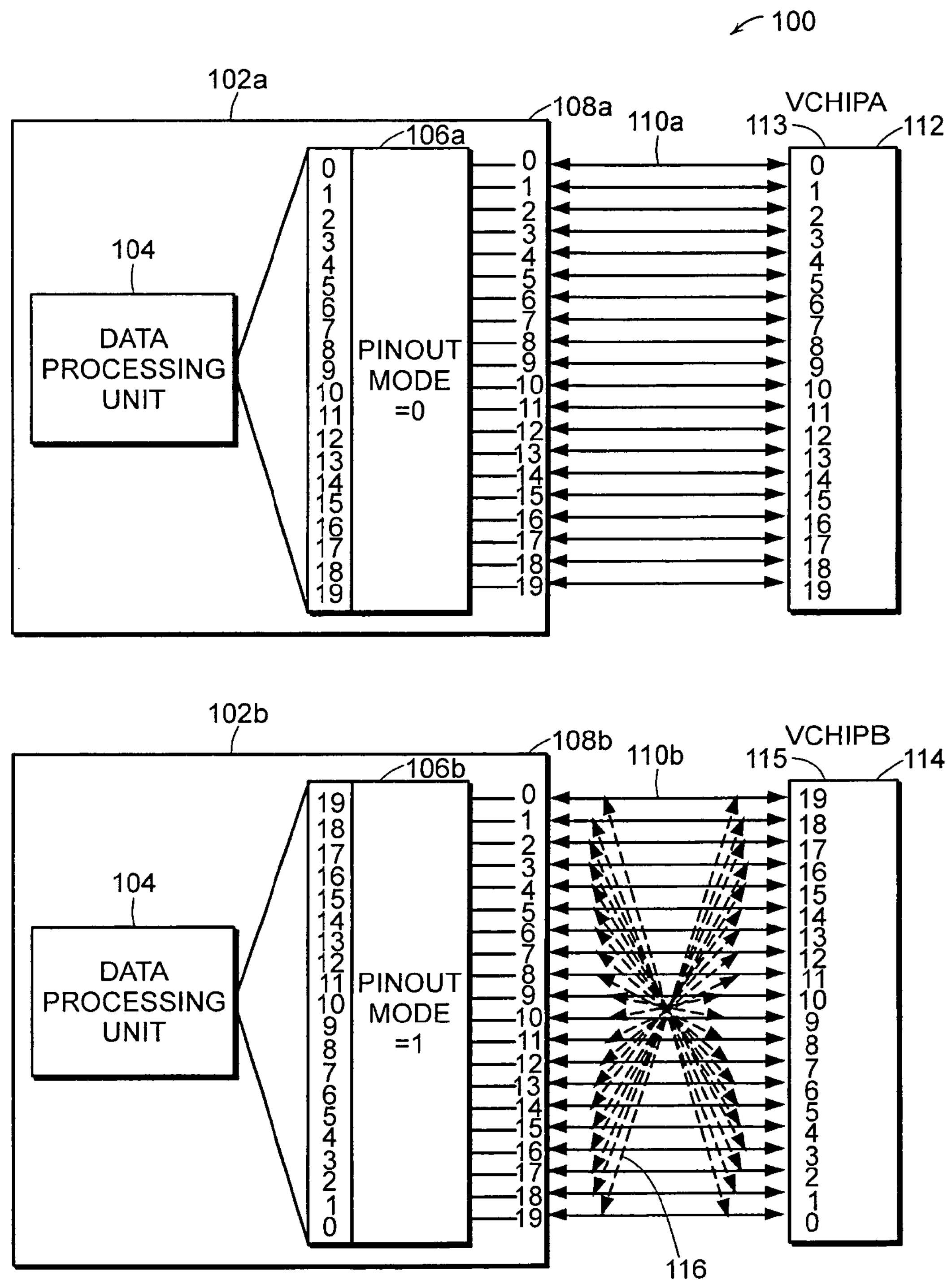
FIG. 4 is a block diagram of a third embodiment of a circuit board arrangement.

FIG. 4 is a block diagram of a third embodiment of a circuit board arrangement that illustrates another aspect of the invention. The board 100 includes a pair of integrated circuit devices 102*a*, 102*b* that each include a data processing unit 104 internally coupled to bitwise pins 108. The board also includes integrated circuits 112, 114 that have respective pinout configurations 113, 115 connected to the pins 108 across wire connections 110.

In this arrangement, the integrated circuit 112 is shown having pinouts delineated in ascending order from the top left edge of the device. For integrated circuit 114 the pins are delineated in descending order from the top left edge of the device. Thus, the ordering of the pins in this particular example is different for each device 112, 114. Because the ordering is different, the wiring on the printed circuit board from the devices 112, 114 to devices 102*a*, 102*b* having identical pinouts 108 would normally need to be different. For example, the wiring 110*a* from pins 108*a*-0, 108*a*-1, 108*a*-2, . . . , 108*a*-19 of device 102*a* to respective pins 113-0, 113-1, 113-2, . . . , 113-19 can be done with no wire crossings. In contrast, the wiring from pins 108*b*-0, 108*b*-1, 108*b*-2, . . . , 108*b*-19 of device 102*b* to respective pins 115-0, 115-1, 115-2, . . . , 115-19 would have at most only one or two pins wired with no crossing, and the eighteen other wires do cross each other. This wire pattern is shown as dotted lines 116. The crossing wires 116 would cause expensive wire routing problems on the board.

To avoid this potential wiring problem, a pinout mode capability on the devices 102*a*, 102*b* provides a mapping function that maps the physical pins to logical bit numbers based on a selected pinout mode, each mode defining a different pin mapping. This mapping capability effectively redefines the device pinouts, with the result that both devices can be wired to the integrated circuits 112, 114 in an efficient manner, despite the different pinout ordering on devices 112, 114. Thus, with the pinout mode capability, wiring 110*b* from pins 108*b*-0, 108*b*-1, 108*b*-2, . . . , 108*b*-19 of device 102*b* is made to respective pins 115-19, 115-18, 115-17, . . . , 115-0.

The different pinout modes for devices 102*a*, 102*b* are shown at 106*a*, 106*b*, respectively. For one mode (e.g., pinout mode=0) the pins are mapped to an ascending sequence. That is, as shown for device 102*a*, pins 108*a*-0, 108*a*-1, 108*a*-2, . . . , 108*a*-19 are mapped from the top to the bottom edge. For another mode (e.g., pinout mode=1) the pinouts are mapped to a descending sequence. That is, as shown for device 102*b*, pins 108*b*-0, 108*b*-1, 108*b*-2, . . . , 108*b*-19 are mapped from bottom to top. In this manner, for example, data received from pin 115-19 that is wired to pin 108*b*-0 is assigned bit position 19 rather than bit position 0 for connecting to data processing unit 104. In contrast, data received from pin 113-0 that is wired to pin 108*a*-0 is assigned bit position 0 for connecting to data processing unit 104.

Embodiments of the invention that employ busses using differential signaling may swap differential pairs of pins rather than individual pins. In this manner, the differential receiver and transmitter circuitry (JO cell) is not perturbed by pinout modes. In fact, whether the interface is differential or not, it is typically advantageous to have the pinout mode mapping take place in the interior of the integrated circuit rather than at the 10 cells.

With the pinout capability illustrated in the embodiment of FIG. 4, several different vendor chips each having a different pinout configuration can be accommodated by a single device that has the pinout mapping of the present approach. This capability can also accommodate pinout transformations caused by rotating a part and/or placing it on the opposite side of the printed circuit board. Using pinout mode in this manner reduces the design and cost of circuit boards. It also increases the attractiveness of such a pinout mode enabled device.

It should be understood that while the pinout modes described herein for the embodiments have been binary (0 or 1), other modes defining other pinout sequences for multiple configurations are also contemplated by the principles of the invention.

While this invention has been particularly shown and described with references to preferred embodiments thereof, it will be understood by those skilled in the art that various changes in form and details may be made therein without departing from the scope of the invention encompassed by the appended claims.

What is claimed is:

1. An integrated circuit device comprising:

a first data interface including plural physical device ports each having a physical port identifier;

a device pinout mode input to the integrated circuit device;

a mapper providing a mapping function that maps physical ports to logical ports, the mapper mapping the physical port identifiers to an equal number of logical port identifiers based on a selected device pinout mode setting at the device pinout mode input, each device pinout setting defining a different port mapping;

a data circuit coupled to the first data interface, the data circuit processing data sent to and received from the first data interface based on the logical port identifiers.

2. The device of claim 1 further comprising a second data interface and wherein the data circuit comprises datapath circuitry for connecting data between the first data interface and the second data interface, the datapath circuitry including:

a first packet converter for converting first data packets received from a particular first data interface physical port to second data packets to send to the second data interface, the second data packets having a port identifier corresponding to the logical port identifier associated with the physical port identifier of the particular first data interface physical port, based on the selected mode setting; and a second packet converter for converting second data packets having a port identifier received from the second data interface to first data packets to send to the particular first data interface physical port associated with the logical port identifier corresponding to the port identifier, based on the selected mode setting.

3. The device of claim 2 wherein the mode setting is selected based on connections between the first data interface physical ports and a backplane or other connector.

4. The device of claim 3 wherein for one mode setting the logical port identifiers correspond to one connection sequence and for another mode setting the logical port identifiers correspond to another connection sequence.

5. The device of claim 2 wherein the first data interface comprises a backplane or other connector interface and the second data interface comprises a System Packet Interface.

6. The device of claim 1 wherein the data circuit comprises a data processing unit and the first data interface physical ports comprise bitwise numbers and logical ports comprise bit numbers.

7. The device of claim 6 wherein the mode setting is selected based on connections between the bitwise pinouts and corresponding bitwise pinouts of at least one other device.

8. The device of claim 7 wherein for one mode setting the logical port identifiers correspond to one connection sequence and for another mode setting the logical port identifiers correspond to another connection sequence that is the reverse of the one connection sequence.

9. An integrated circuit device comprising:

a first data interface including N device ports;

a second data interface including N device ports;

a device pinout mode input to the integrated circuit device;

a mapper providing a mapping function that maps physical ports to logical ports, the mapper mapping the N ports of the first data interface to the N ports of the second data interface in a sequence based on a selected device pinout mode setting at the device pinout mode input, each device pinout mode setting defining a different port mapping.

10. The device of claim 9 wherein for one mode setting the port mapping corresponds to one sequence and for another mode setting the port mapping corresponds to another sequence.

11. The device of claim 9 wherein the first and second data interfaces are backplane or other connector interfaces.

12. A printed circuit board comprising:

at least one integrated circuit device having a first data interface including plural physical device ports each having a physical port identifier, a device pinout mode input to the integrated circuit device, a mapper providing a mapping function that maps physical ports to logical ports, the mapper mapping the physical port identifiers to an equal number of logical port identifiers based on a selected device pinout mode setting at the device pinout mode input, each device pinout mode setting defining a different port mapping, and a data circuit coupled to the first data interface, the data circuit processing data sent to and received from the first data interface based on the logical port identifiers;

plural backplane or other connector ports; and plural links connecting the first data interface physical ports to the plural backplane or other connector ports, wherein the mode setting is selected based on the connection sequence between the first data interface physical ports and the backplane or other connector ports.

13. The printed circuit board of claim 12 wherein the integrated circuit device comprises two integrated circuit devices, each having a different mode setting, wherein for one mode setting the logical port identifiers correspond to one connection sequence and for another mode setting the logical port identifiers correspond to another connection sequence.

14. The printed circuit board of claim 12 further comprising a second data interface and wherein the data circuit comprises datapath circuitry for connecting data between the first data interface and the second data interface, the datapath circuitry including:

a first packet converter for converting first data packets received from a particular first data interface physical port to second data packets to send to the second data interface, the second data packets having a port identifier corresponding to the logical port identifier associated with the physical port identifier of the particular first data interface physical port, based on the selected mode setting; and a second packet converter for converting second data packets having a port identifier received from the second data interface to first data packets to send to the particular first data interface physical port associated with the logical port identifier corresponding to the port identifier, based on the selected mode setting.

15. The printed circuit board of claim 14 wherein the first data interface comprises a backplane or other connector interface and the second data interface comprises a System Packet Interface.

16. A method of data processing in an integrated circuit device, the method comprising:

providing a first data interface including plural physical device ports each having a physical port identifier;

selecting a pinout mode setting at the integrated circuit device;

mapping physical ports to logical ports, the mapping including mapping the physical port identifiers to an equal number of logical port identifiers in the integrated circuit device based on the selected device pinout mode setting, each device pinout mode setting defining a different port mapping; and processing data sent to and received from the first data interface based on the logical port identifiers.

17. The method of claim 16 further comprising providing a second data interface and wherein the processing includes:

converting first data packets received from a particular first data interface physical port to second data packets to send to the second data interface, the second data packets having a port identifier corresponding to the logical port identifier associated with the physical port identifier of the particular first data interface physical port, based on the selected mode setting; and converting second data packets having a port identifier received from the second data interface to first data packets to send to the particular first data interface physical port associated with the logical port identifier corresponding to the port identifier, based on the selected mode setting.

18. The method of claim 17 wherein the mode setting is selected based on connections between the first data interface physical ports and a backplane or other connector, for one mode setting the logical port identifiers correspond to one connection sequence and for another mode setting the logical port identifiers correspond to another connection sequence that is the reverse of the one connection sequence.

19. The method of claim 16 wherein the first data interface physical ports comprise bitwise pinouts and the mode setting is selected based on connections between the bitwise pinouts and corresponding bitwise pinouts of another device, for one mode setting the logical port identifiers correspond to one connection sequence and for another mode setting the logical port identifiers correspond to another connection sequence that is the reverse of the one connection sequence.

20. An integrated circuit device comprising:

means for data interface including plural physical device ports each having a physical port identifier;

means for selecting a pinout mode setting at the integrated circuit device;

means for mapping physical ports to logical ports, including mapping the physical port identifiers to an equal number of logical port identifiers based on the selected device pinout mode setting, each device pinout mode setting defining a different port mapping; and means for processing data sent to and received from the means for data interface based on the logical port identifiers.

* * * * *